(12) United States Patent
Suto et al.

(10) Patent No.: US 7,319,581 B2
(45) Date of Patent: Jan. 15, 2008

(54) CAPACITIVE PRESSURE SENSOR (75) Inventors: Toshihide Suto, Miyagi-ken (JP); Shigefumi Sakai, Miyagi-ken (JP); Sasahiro Takahashi, Miyagi-ken (JP)

(73) Assignee: ALPS Electric Co., Ltd., Ota-ku, Tokyo (JP)

( * ) Notice: Subject to any disclaimer, the term of this patent is extended or adjusted under 35 U.S.C. 154(b) by 241 days.

(21) Appl. No.: 11/292,445

(22) Filed: Dec. 2, 2005

(65) Prior Publication Data

US 2006/0133006 A1 Jun. 22, 2006

(30) Foreign Application Priority Data

Dec. 17, 2004 (JP) .............................. 2004-365969

(51) Int. Cl.
*H01G 7/00* (2006.01)
(52) U.S. Cl. .................................... 361/283.4; 361/277
(58) Field of Classification Search ... 361/283.1–283.4
See application file for complete search history.

(56) References Cited

U.S. PATENT DOCUMENTS

| | | | | |
|---|---|---|---|---|
| 4,609,966 A | * | 9/1986 | Kuisma | 361/283.1 |
| 4,996,627 A | * | 2/1991 | Zias et al. | 361/283.4 |
| 5,050,034 A | | 9/1991 | Hegner et al. | |
| 6,338,284 B1 | * | 1/2002 | Najafi et al. | 73/866.1 |
| 6,595,064 B2 | * | 7/2003 | Drewes et al. | 73/718 |

FOREIGN PATENT DOCUMENTS

JP 2772111 4/1998

* cited by examiner

*Primary Examiner*—Eric Thomas
(74) *Attorney, Agent, or Firm*—Beyer Weaver LLP (57) ABSTRACT

A capacitive pressure sensor includes: a conductive silicon substrate having a diaphragm; an insulating substrate having a fixed electrode, the insulating substrate overlapping the conductive silicon substrate so as to be bonded thereto; and a sealed chamber formed between the diaphragm and the fixed electrode. A conductive silicon member is buried in a part of the insulating substrate, a portion of the conductive silicon member is exposed toward a surface of the insulating substrate facing the sealed chamber so as to form the fixed electrode, and another portion of the conductive silicon member is exposed toward the other surface of the insulating substrate not facing the sealed chamber so as to form a lead electrode of the fixed electrode.

6 Claims, 6 Drawing Sheets

CAPACITIVE PRESSURE SENSOR

BACKGROUND OF THE INVENTION

1. Field of the Invention

The present invention relates to a capacitive pressure sensor having a diaphragm.

2. Description of the Related Art

In recent years, a capacitive pressure sensor has been widely used in that it is small and a structure thereof is simple. For example, the capacitive pressure sensor has been adopted as a means for monitoring the tire pressure of an automobile.

A conventional capacitive pressure sensor is disclosed in Japanese Patent No. 2772111. As shown in FIG. 1 of Japanese Patent No. 2772111, the capacitive pressure sensor is configured such that a glass substrate is bonded to a silicon substrate having a pressure sensitive diaphragm portion, a reference pressure chamber is provided between the silicon substrate and the glass substrate in the vicinity of a location where the pressure sensitive diaphragm portion is formed, and a first electrode is formed at a side of the reference pressure chamber facing the glass substrate. Further, in the vicinity of the reference pressure chamber, the glass substrate is provided with a first opening portion and the first opening portion is provided with a first lead portion. Furthermore, on a surface of the glass substrate facing the reference pressure chamber, a cover plate composed of a silicon plate is provided to abut the first lead portion. In addition, a part of the first electrode is connected to the cover plate.

In the conventional capacitive pressure sensor described above, since the first electrode is connected to the first lead portion of the glass substrate not facing the reference pressure chamber through the cover plate, the cover plate and the first lead portion can be used as lead wiring lines of the first electrode.

However, in the capacitive pressure sensor disclosed in Japanese Patent No. 2772111, it is necessary to dispose the cover plate in the vicinity of the reference pressure chamber so as to lead the first electrode. Since the cover plate is disposed to be face the silicon substrate having the pressure sensitive diaphragm portion, a static capacitance is generated between the cover plate and the silicon substrate to become a parasitic capacitance. As a result, there is a possibility that the parasitic capacitance will cause the pressure sensitivity of the capacitive pressure sensor to be lowered. Accordingly, as shown in FIG. 1 in Japanese Patent No. 2772111, in the capacitive pressure sensor disclosed in Japanese Patent No. 2772111, a reference-pressure-chamber-side surface of the silicon substrate facing the cover plate is recessed farther from the diaphragm portion, so that the distance between the silicon substrate and the cover plate becomes large. Thereby, the parasitic capacitance is reduced, which prevents the pressure sensitivity from being lowered.

In the capacitive pressure sensor, it is necessary to secure a region where the lead wiring lines are to be formed in the vicinity of the reference pressure chamber so as to provide the cover plate and the first lead portion serving as the lead wiring lines of the first electrode. Accordingly, there has been a problem in that the pressure sensor cannot be made small. In addition, in order to recess the part of the silicon substrate corresponding to the cover plate for the purpose of reducing the parasitic capacitance, the thickness of the silicon substrate should be relatively large. For this reason, there has been a problem in that it is difficult to make the pressure sensor thin.

Further, in order to prepare the lead wiring lines, complicated processes are needed in which the first opening portion is provided on one surface side of the glass substrate, the first lead portion is formed in the opening portion by an etching process, and the cover plate is formed on the other surface of the glass substrate. Accordingly, the structure of the sensor becomes complicated. In particular, since a structure in which the reference pressure chamber is sealed by the cover plate is adopted, there is a possibility that the reference pressure chamber will not be reliably sealed.

SUMMARY OF THE INVENTION

The invention is designed to solve the above problem, and it is an object of the invention to provide a capacitive pressure sensor which is small, thin, and has a simple configuration and a high reliability.

In order to achieve the above object, according to an aspect of the invention, a capacitive pressure sensor includes: a conductive silicon substrate having a diaphragm; an insulating substrate having a fixed electrode, the insulating substrate overlapping the conductive silicon substrate so as to be bonded thereto; and a sealed chamber formed between the diaphragm and the fixed electrode. A conductive silicon member is buried in a part of the insulating substrate, a portion of the conductive silicon member is exposed toward a surface of the insulating substrate facing the sealed chamber so as to form the fixed electrode, and another portion of the conductive silicon member is exposed toward the other surface of the insulating substrate not facing the sealed chamber so as to form a lead electrode of the fixed electrode.

In the capacitive pressure sensor, preferably, the conductive silicon member is buried to pass through between the surface of the insulating substrate facing the sealed chamber and the other surface of the insulating substrate not facing the sealed chamber.

Further, in the capacitive pressure sensor, preferably, an electrode surface of the fixed electrode formed by the conductive silicon member and the surface of the insulating substrate facing the sealed chamber are located on the same plane.

Furthermore, in the capacitive pressure sensor, preferably, the electrode surface of the fixed electrode formed by the conductive silicon member is recessed toward the lead electrode from the surface of the insulating substrate facing the sealed chamber.

Furthermore, in the capacitive pressure sensor, preferably, the sealed chamber is formed to be partitioned by only the fixed electrode, the insulating substrate, and the conductive silicon substrate.

Furthermore, in the capacitive pressure sensor, preferably, the insulating substrate is a glass substrate.

In the capacitive pressure sensor having the configuration described above, since the portion of the conductive silicon member is exposed toward the surface of the insulating substrate facing the sealed chamber so as to form the fixed electrode and another portion of the conductive silicon member is exposed toward the other surface of the insulating substrate not facing the sealed chamber so as to form the lead electrode, it is possible to form the fixed electrode, the lead wiring lines thereof, and the first lead electrode by using the conductive silicon member. As a result, the configuration of the capacitive pressure sensor can be simplified. Further, since it is not necessary to provide the space for forming the lead wiring lines in the vicinity of the sealed chamber, it is possible to make the capacitive pressure sensor small and to eliminate the parasitic capacitance. Furthermore, since it is not necessary to provide a separate structure for reducing the parasitic capacitance, the capacitive pressure sensor can be made thin.

Further, in the capacitive pressure sensor, since the conductive silicon member is buried to pass through between the surface of the insulating substrate facing the sealed chamber and the other surface of the insulating substrate not facing the sealed chamber, the lead electrode becomes located on the other surface of the glass substrate. Thereby, the fixed electrode can be easily connected to an external circuit through the lead electrode.

Furthermore, in the capacitive pressure sensor, since the electrode surface of the fixed electrode and the surface of the insulating substrate facing the sealed chamber are located on the same plane, it is possible to adjust the distance between the fixed electrode and the diaphragm without considering the height where the fixed electrode protrudes from the insulating substrate. In addition, since the fixed electrode does not protrude from the insulating substrate, the capacitive pressure sensor can be made even thinner.

Further, in the capacitive pressure sensor, since the electrode surface of the fixed electrode is recessed toward the lead electrode from the surface of the insulating substrate facing the sealed chamber, an empty portion formed by recessing the conductive silicon member can be used as the sealed chamber. Thereby, it is possible to make the capacitive pressure sensor even thinner.

Furthermore, in the capacitive pressure sensor, since the sealed chamber is formed to be partitioned by only the fixed electrode, the insulating substrate, and the conductive silicon substrate, the sealed chamber can be sealed even more reliably. As a result, the reliability on the capacitive pressure sensor can be improved.

DESCRIPTION OF THE PREFERRED EMBODIMENT

Figure 1:
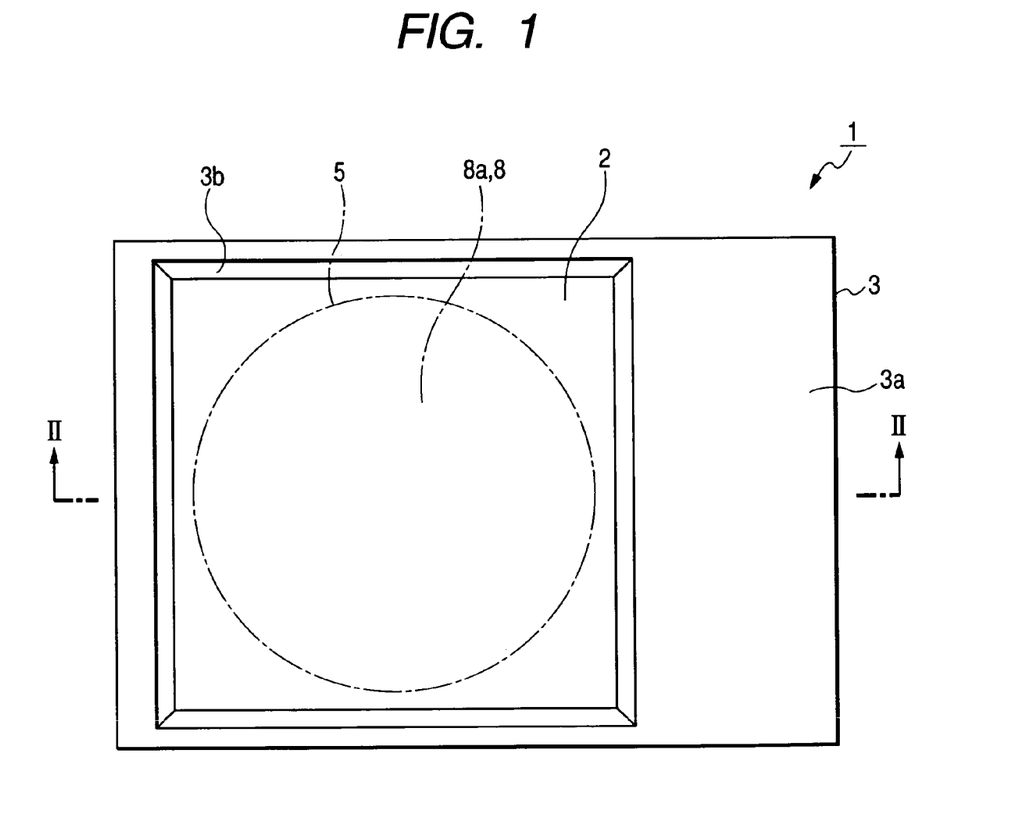
FIG. 1 is a plan view illustrating an example of a capacitive pressure sensor according to an embodiment of the invention.
Figure 2:
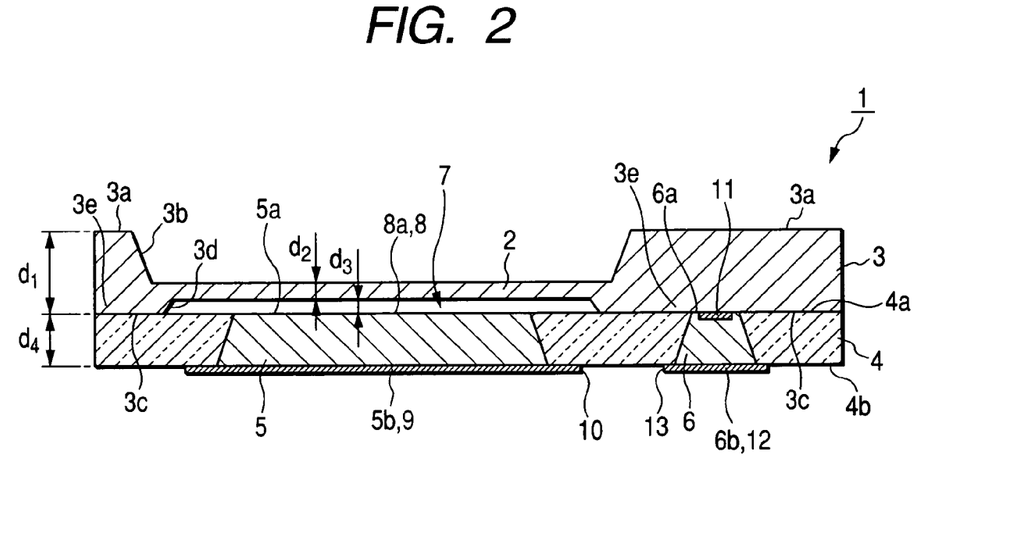
FIG. 2 is a cross-sectional view taken along the line II-II of FIG. 1.
Figure 5A:
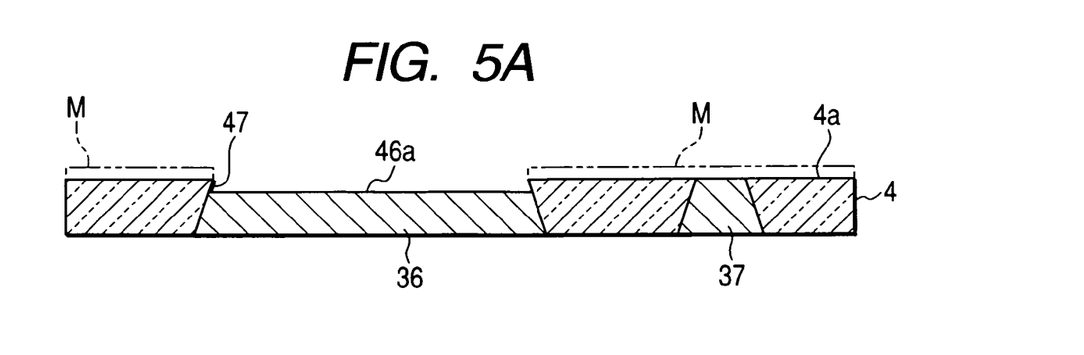
FIGS. 5A to 5C are cross-sectional views explaining another example of the capacitive pressure sensor according to the embodiment and a method of manufacturing the same.
Figure 5B:
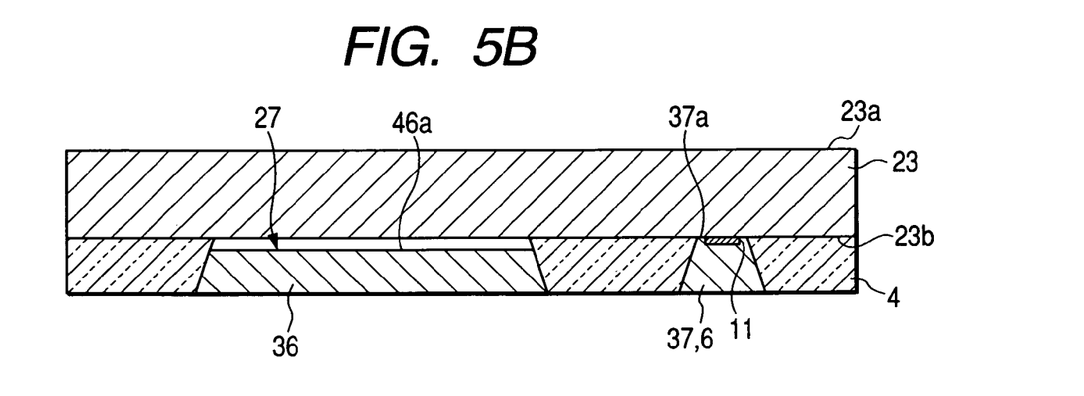
Figure 5C:
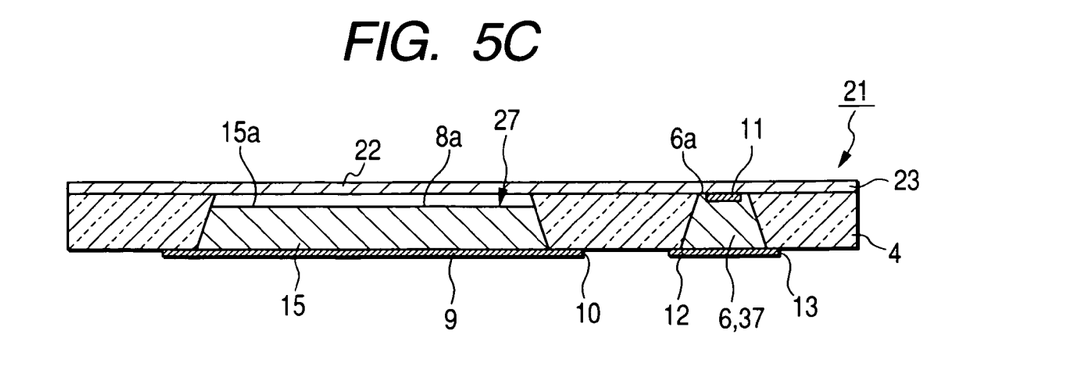
Figure 6:
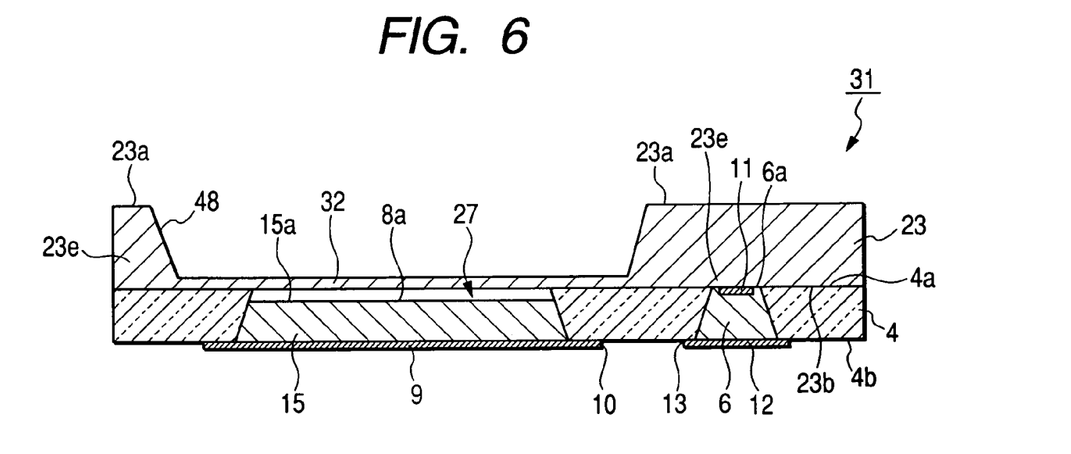
FIG. 6 is a cross-sectional view illustrating another example of the capacitive pressure sensor according to the embodiment.

Hereinafter, the preferred embodiments of the invention will be described with reference to the accompanying drawings. FIG. 1 is a plan view illustrating an example of a capacitive pressure sensor according to the present embodiment, and FIG. 2 is a cross-sectional view taken along the line II-II of FIG. 1. FIGS. 3A to 3C and 4A to 4C are process views explaining a method of manufacturing a capacitive pressure sensor. FIGS. 5A to 5C are cross-sectional views explaining another example of the capacitive pressure sensor according to the present embodiment and a method of manufacturing the same. FIG. 6 is a cross-sectional view illustrating another example of the capacitive pressure sensor according to the present embodiment.

Further, FIGS. 1 to 6 are views explaining the configuration of the capacitive pressure sensor according to the present embodiment and the method of manufacturing the same, the measuring range of the capacitive pressure sensor being 0 to several hundreds KPa (gauge pressure). In addition, the size, thickness, or dimension of each part shown in the respective drawings may be different from that of an actual capacitive pressure sensor.

Capacitive Pressure Sensor

A capacitive pressure sensor 1 shown in FIGS. 1 and 2 includes a silicon substrate 3 (conductive silicon substrate 3) having a pressure sensitive diaphragm 2, a glass substrate (insulating substrate) 4 bonded to the silicon substrate 3 so as to overlap the silicon substrate 3, first and second conductive silicon members 5 and 6 (conductive silicon members 5 and 6) buried in the glass substrate 4. A sealed chamber 7 is provided between the pressure sensitive diaphragm 2 and the first conductive silicon member 5. A surface (part) 5a of the first conductive silicon member 5 is exposed toward the sealed chamber 7 to form an electrode surface 8a of a fixed electrode 8.

The silicon substrate 3 is a semiconductor substrate whose overall thickness $d_1$ is about 300 to 500 μm and resistivity is about 0.001 to 0.01 Ω·cm. On a surface 3a of the silicon substrate 3, a first recessed portion 3b which is approximately rectangular in plan view is provided, and on the other surface 3c of the silicon substrate 3, a second recessed portion 3d is provided to be opposite to the first recessed portion 3b. A region interposed between the first and second recessed portions 3b and 3d is the pressure sensitive diaphragm 2. Since the pressure sensitive diaphragm 2 is a part of the silicon substrate 3 as described above, the pressure sensitive diaphragm 2 itself serves as an opposite electrode opposite to the fixed electrode 8 with the sealed chamber 7 interposed therebetween. The thickness $d_2$ of the pressure sensitive diaphragm 2 is set to about 50 to 60 μm because the first and second recessed portions 3b and 3d are provided. Further, the second recessed portion 3d is sealed by the glass substrate 4 bonded to the silicon substrate 3, and as a result, the second recessed portion 3d becomes the sealed chamber 7. The distance $d_3$ between the diaphragm 2 and the electrode surface 8a of the first fixed electrode 8 is determined by the depth of the second recessed portion 3d forming the sealed chamber 7. Specifically, the distance $d_3$ is set to about 0.7 to 0.8 μm. The other surface 3c of the silicon substrate 3 overlaps one surface 4a of the glass substrate 4, and both the substrates 3 and 4 are firmly bonded to each other by an anodic bonding process. Since the second recessed portion 3d is provided on the other surface 3c of the silicon substrate 3, a part of the silicon substrate 3 actually bonded to the glass substrate 4 is a peripheral portion 3e excluding a region where the second recessed portion 3d is formed. Here, the second recessed portion 3d is preferably formed to be larger than the electrode surface 8a of the fixed electrode 8. Thereby, the peripheral portion 3e of the silicon substrate 3 is bonded to the one surface 4a of the glass substrate 4 located around the fixed electrode 8 and the pressure sensitive diaphragm 2 and the fixed electrode 8 are insulated from each other by the glass substrate 4, and accordingly, it is possible to prevent the pressure sensitive diaphragm 2 and the fixed electrode 8 from being short-circuited.

Next, the glass substrate 4 is an insulating substrate having a thickness $d_1$ of about 300 to 500 μm. Preferably, a material of the glass substrate 4 has approximately the same coefficient of thermal expansion as those of the silicon substrate 3 and the first and second conductive silicon members 5 and 6 around 400° C. where silicon and glass are bonded to each other. Specifically, it is preferable that a Pyrex (registered trademark) sold as an anodic bonding glass be used as the material of the glass substrate 4. The first and second conductive silicon members 5 and 6 are buried in the glass substrate 4. The first and second conductive silicon members 5 and 6 are n-type semiconductors. In addition, the first and second conductive silicon members 5 and 6 are firmly bonded to the glass substrate 4 by the anodic bonding process.

As shown FIGS. 1 and 2, the first conductive silicon member 5 has approximately a circular shape in plan view, and at the same time, approximately a trapezoidal shape in cross-sectional view, and the overall shape of the first conductive silicon member 5 is formed by removing a top portion of a conical body. Further, when the first conductive silicon member 5 is formed by an anisotropic wet etching process, the first conductive silicon member 5 has an octagonal pillar shape. Here, a case will be described in which the first conductive silicon member 5 is formed to have a cylindrical shape by performing a dry etching process by which the shape in plan view can be free to be selected. The first conductive silicon member 5 is buried to face the pressure sensitive diaphragm 2 in a state in which the first conductive silicon member 5 passes through the glass substrate 4. The first conductive silicon member 5 passes through the glass substrate 4, and thus the one surface (part) 5a thereof is exposed toward the one surface 4a of the glass substrate 4, that is, the sealed chamber 7. Similarly, the other surface (separate part) 5b of the first conductive silicon member 5 is exposed to the surface 4b of the glass substrate 4 not facing the sealed chamber 7. In addition, the one surface 5a of the first conductive silicon member 5 exposed toward the sealed chamber 7 forms the electrode surface 8a of the fixed electrode 8 of the capacitive pressure sensor 1. The electrode surface 8a is located on the same plane as the one surface 4a of the glass substrate 4. Further, the other surface 5b of the first conductive silicon member 5 exposed toward a side not facing the sealed chamber 7 forms a first lead electrode (lead electrode) 9 of the fixed electrode 8. A first conductive metal film 10 is stacked on the first lead electrode 9, and the first lead electrode 9 and the first conductive metal film 10 form a terminal portion of the fixed electrode 8.

Next, the second conductive silicon member 6 has approximately a trapezoidal shape in cross-sectional view and the overall shape of the second conductive silicon member 6 is formed by removing a top portion of a conical body, in the same manner as the first conductive silicon member 5. The second conductive silicon member 6 is buried to face the peripheral portion 3e of the silicon substrate 3 in a state in which the second conductive silicon member 6 passes through the glass substrate 4. The second conductive silicon member 6 passes through the glass substrate 4, and thus the one surface (part) 6a thereof is connected to the peripheral portion 3e of the silicon substrate 3. A connection electrode 11 composed of a metal film is disposed between the peripheral portion 3e of the silicon substrate 3 and the second conductive silicon member 6, and the connection electrode 11 allows the peripheral portion 3e and the second conductive silicon member 6 to be electrically conducted. Further, the second conductive silicon member 6 passes through the glass substrate 4, and thus the other surface (separate part) 6b of the second conductive silicon member 6 is exposed to a surface of the glass substrate 4 not facing the sealed chamber 7. With the configuration described above, the second conductive silicon member 6 itself serves as a lead wiring portion by which the pressure sensitive diaphragm 2 is led to the other surface 4b of the glass substrate 4. In addition, the other surface 6b of the second conductive silicon member 6 exposed toward the side not facing the sealed chamber 7 forms a second lead electrode 12 for the pressure sensitive diaphragm 2. A second conductive metal film 13 is stacked on the second lead electrode 12, and the second lead electrode 12 and the second conductive metal film 13 form a terminal portion of the pressure sensitive diaphragm 2.

In the capacitive pressure sensor 1 having the configuration described above, the pressure sensitive diaphragm 2 is bent toward the fixed electrode 8 or toward a side opposite to the fixed electrode 8 due to the pressure of an object to be measure, so that the pressure sensitive diaphragm 2 deforms. Thereby, the distance $d_3$ between the pressure sensitive diaphragm 2 and the fixed electrode 8 varies, which changes the static capacitance between the pressure sensitive diaphragm 2 and the fixed electrode 8. Since the fixed electrode 8 is connected to the first lead electrode 9 provided at the other surface side of the glass substrate 4 through the first conductive silicon member 5 while the pressure sensitive diaphragm 2 is connected to the second lead electrode 12 provided at the other surface side of the glass substrate 4 through the peripheral portion 3e of the silicon substrate 3 and the second conductive silicon member 6, the variation of the static capacitance between the pressure sensitive diaphragm 2 and the fixed electrode 8 is output as a potential difference between the first and second lead electrodes 9 and 12. As such, the pressure of the object to be measured is detected and measured.

In the capacitive pressure sensor 1 having the configuration described above, since the fixed electrode 8, lead wiring lines thereof, and the first lead electrode 9 can be formed by using the first conductive silicon member 5, the configuration of the capacitive pressure sensor 1 can be simplified. Further, since it is not necessary to provide the space for forming the lead wiring lines in the vicinity of the sealed chamber 7, the capacitive pressure sensor 1 can be made small. Furthermore, since the fixed electrode 8 is opposite to only the pressure sensitive diaphragm 2 and the pressure sensitive diaphragm 2 is opposite to only the fixed electrode 8, the parasitic capacitance can be eliminated. In addition, since it is not necessary to provide a separate structure for reducing the parasitic capacitance, the capacitive pressure sensor 1 can be made thin.

Further, since the conductive silicon member 5 is buried so as to pass through between the surface 4a facing the sealed chamber 7 and the other surface 4b not facing the sealed chamber 7, the first lead electrode 9 is located on the other surface 4b of the glass substrate 4. Thereby, the fixed electrode 8 can be easily connected to an external circuit through the first lead electrode 9. Furthermore, since the electrode surface 8a of the fixed electrode 8 and the surface 4a of the glass substrate 4 facing the sealed chamber 7 are located on the same plane, the distance $d_3$ between the fixed electrode 8 and the pressure sensitive diaphragm 2 can be adjusted without considering the height where the fixed electrode 8 protrudes from the glass substrate 4. Furthermore, since the fixed electrode 8 does not protrude from the glass substrate 4, the capacitive pressure sensor 1 can be made thin. Furthermore, since the sealed chamber 7 is formed to be partitioned by only the fixed electrode 8, the glass substrate 4, and the silicon substrate 3 and they are firmly bonded to one another by the anodic bonding process, the sealed chamber 7 can be sealed even more reliably. As a result, the reliability on the capacitive pressure sensor 1 can be improved.

In addition, since the coefficient of thermal expansion of the glass substrate 4 is set to be almost equal to those of the silicon substrate 3 and the first and second conductive silicon members 5 and 6, there is no possibility that peeling or cracking among the glass substrate 4, the silicon substrate 3, and the first and second conductive silicon members 5 and 6 will occur even when the capacitive pressure sensor 1 is placed in a high temperature atmosphere. As a result, the heat resistivity of the capacitive pressure sensor 1 can be improved.

Method of Manufacturing Capacitive Pressure Sensor

Next, a method of manufacturing the capacitive pressure sensor 1 will be described.

Figure 3A:
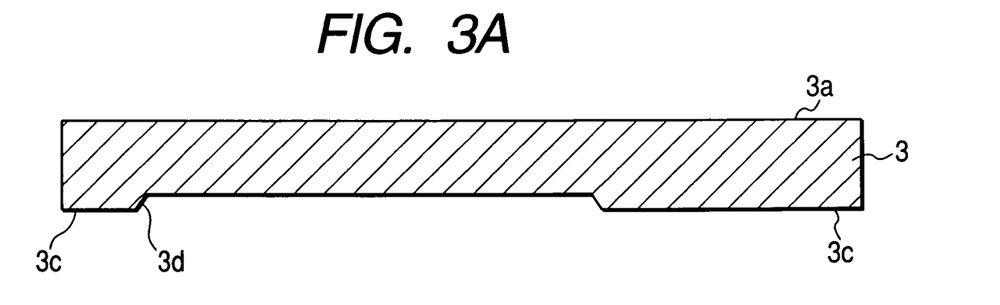
FIGS. 3A to 3C are views explaining processes according to a method of manufacturing the capacitive pressure sensor.

First, as shown in FIG. 3A, the silicon substrate 3 is prepared, and the second recessed portion 3d is formed on the other surface 3c of the silicon substrate 3. The second recessed portion 3d can be formed by using a general photolithographic technique. In other words, a silicon oxide layer is formed on the entire other surface 3c of the silicon substrate 3, then a mask is formed on the silicon oxide layer, then the silicon oxide layer is patterned so as to remove a part of the silicon oxide layer where the second recessed portion 3d is to be formed, then the mask is removed, and then the silicon substrate 3 is wet-etched with the patterned silicon oxide layer as a mask by using, for example, a TMAH solution having a concentration of 40%. Lastly, the silicon oxide layer is removed. As such, the second recessed portion 3d is formed on the other surface 3c of the silicon substrate 3 as shown in FIG. 3A. The depth of the second recessed portion 3d can be adjusted by a wet etching condition.

Figure 3B:
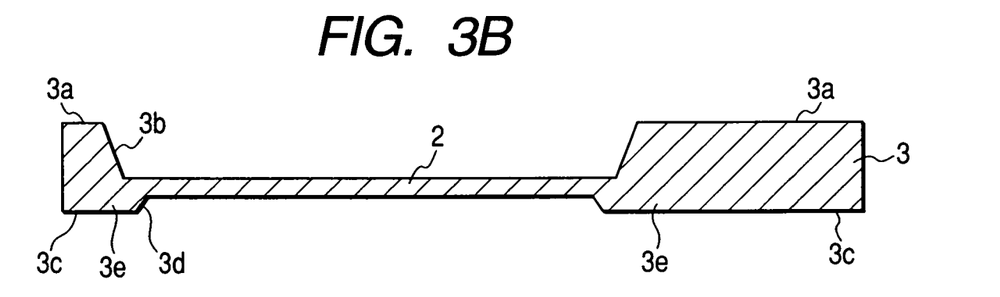

Thereafter, as shown in FIG. 3B, the first recessed portion 3b is formed on the one surface 3a of the silicon substrate 3. The first recessed portion 3b can be formed by using a general photolithographic technique, in the same manner as in the second recessed portion 3d. That is, a silicon oxide layer is formed on the entire one surface 1a of the silicon substrate 3, then the silicon oxide layer is patterned so as to remove a part of the silicon oxide layer where the first recessed portion 3b is to be formed, then the silicon substrate 3 is wet-etched with the patterned silicon oxide layer as a mask, and lastly, the silicon oxide layer is removed. As such, the first recessed portion 3b is formed on the one surface 3a of the silicon substrate 3 as shown in FIG. 3B. The depth of the first recessed portion 3b can be adjusted by a wet etching condition in the same manner as in FIG. 3A. Side surfaces of the first and second recessed portions 3b and 3d have inclined surfaces each having a predetermined angle.

As such, the pressure sensitive diaphragm 2, which is made to be thin by the first and second recessed portions 3b and 3d, is formed on the silicon substrate 3. Further, a portion around the pressure sensitive diaphragm 2 which is not made to be thin becomes the peripheral portion 3e of the silicon substrate 3.

Figure 3C:
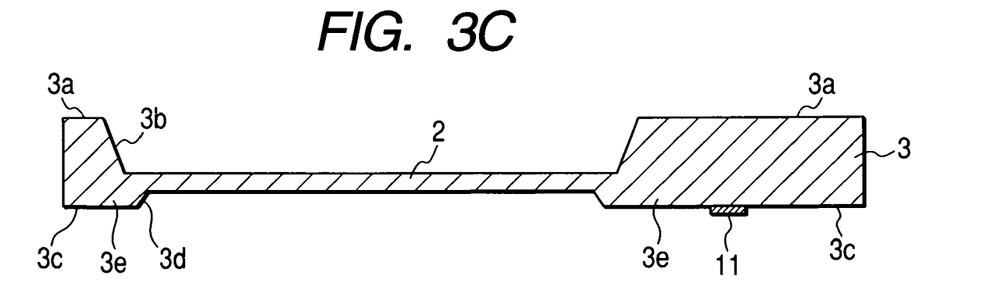

Thereafter, as shown in FIG. 3C, on the other surface 3c of the peripheral portion 3e of the silicon substrate 3, a metal film is formed by using an evaporation method or a sputtering method and then the metal film is trimmed by photographic and etching processes so as to form the connection electrode 11.

Figure 4A:
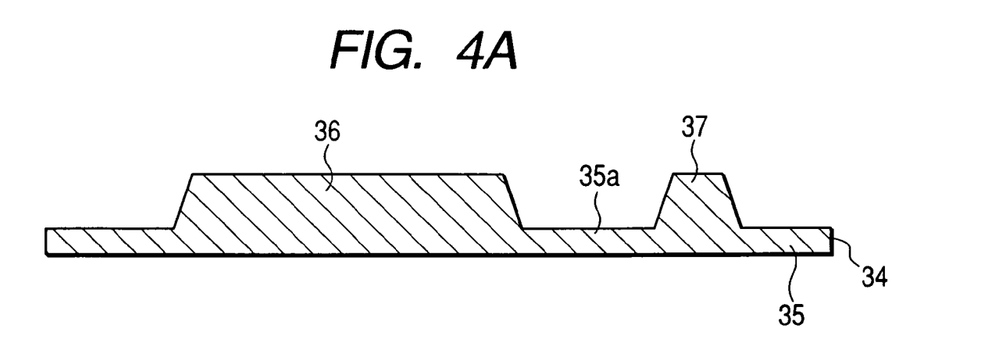
FIGS. 4A to 4C are views explaining processes according to the method of manufacturing the capacitive pressure sensor.

Next, as shown in FIG. 4A, a conductive silicon base 34 is prepared. The conductive silicon base 34 is composed of a flat main base body 35 and a first protruding portion 36 and a second protruding portion 37 formed to protrude toward one surface 35a of the main base body 35. Each of the first and the second protruding portions 36 and 37 has approximately a circular shape in plan view, and at the same time, approximately a trapezoidal shape in cross-sectional view, and the overall shapes thereof are formed by removing a top portion of a conical body.

The conductive silicon base 34 can be obtained by preparing a silicon substrate composed of the same material as the silicon substrate 3 shown in FIG. 3 and providing the first and second protruding portions 36 and 37 on the silicon substrate by applying a general photolithographic technique. Specifically, a silicon oxide layer is formed on the entire upper surface of the silicon substrate, then a mask is formed on the silicon oxide layer, then the silicon oxide layer is patterned so as to remove a part of the silicon oxide layer where the first and second protruding portions 36 and 37 are not to be formed, then the mask is removed, and then the silicon substrate is wet-etched with the patterned silicon oxide layer as a mask by using, for example, a TMAH solution having a concentration of 40%. Lastly, the silicon oxide layer is removed. Thereby, as shown in FIG. 4A, it is possible to obtain the conductive silicon base 34 in which the first and second protruding portions 36 and 37 are formed on the flat main base body 35 such that the first and second protruding portions 36 and 37 protrude from the flat main base body 35. The heights of the first and second protruding portions 36 and 37 can be adjusted by a wet etching condition, and it is preferable that the heights of the first and second protruding portions 36 and 37 be about 300 to 400 μm.

Figure 4B:
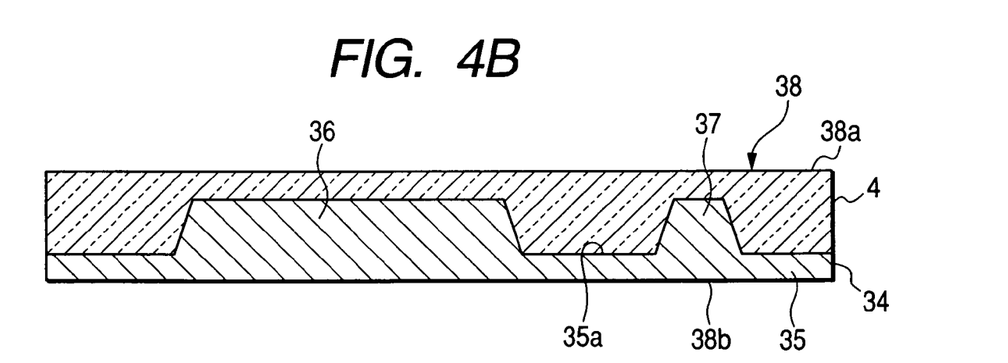

Thereafter, as shown in FIG. 4B, the glass substrate 4 softened by heating is heat-pressed onto the conductive silicon base 34, and thus the first and second protruding portions 36 and 37 are buried in the glass substrate 4 and the glass substrate 4 is stacked on the one surface 35a of the main base body 35 so as to be bonded thereto. More specifically, the conductive silicon base 34 and the glass substrate 4 having a thickness of about 300 to 500 μm are disposed to overlap each other, and then the conductive silicon base 34 and the glass substrate 4 are introduced into a heat press machine. Subsequently, the conductive silicon base 34 and the glass substrate 4 are subjected to a heat press process in a condition of a temperature of 690° C. and a press speed of 0.02 mm/min., for example. At this time, the heat press process is performed until the first and second protruding portions 36 and 37 are buried in the softened glass substrate 4 and the glass substrate 4 is bonded to the one surface 35a of the main base body 35. After the heat press process is performed, preferably, the conductive silicon base 34 and the glass substrate 4 are completely bonded to each other by performing an anodic bonding process. As such, a silicon glass complex 38, which is obtained by integrally forming the conductive silicon base 34 and the glass substrate 4, is formed.

Figure 4C:
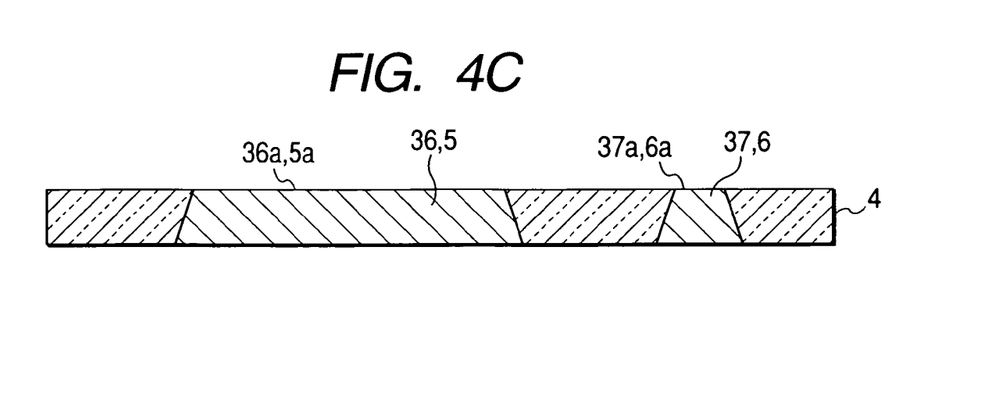

Subsequently, as shown in FIG. 4C, upper and lower surfaces 38a and 38b of the silicon glass complex 38 are polished, and thus upper surfaces 36a and 37a of the first and second protruding portions 36 and 37 are exposed, and at the same time, the main base body 35 of the conductive silicon base 34 is completely removed. Thereby, the first and second protruding portions 36 and 37 are separated from each other.

As such, the glass substrate 4 in which the first and second conductive silicon members 5 and 6 are buried is manufactured.

Then, the glass substrate 4 shown in FIG. 4C and the silicon substrate 3 shown in FIG. 3C are disposed to overlap each other and then both the substrates 3 and 4 are bonded to each other by an anodic bonding process. When both the substrates 3 and 4 are bonded to each other, a positional adjustment is made such that the one surface 5a of the first conductive silicon member 5 is disposed opposite to the pressure sensitive diaphragm 2, the one surface 5a of the first conductive silicon member 5 is disposed so as not to be connected to the peripheral portion 3e of the silicon substrate 3, and the one surface 6a of the second conductive silicon member 6 is connected to the connection electrode 11. After the anodic bonding process is performed, the first and second conductive metal films 10 and 13 are formed on the other surface 4b of the glass substrate 4 by using an evaporation method or a sputtering method and then the conductive metal films 10 and 13 are trimmed by photographic and etching processes. As such, the capacitive pressure sensor 1 shown in FIG. 2 is manufactured.

According to the manufacturing method, only by burying the conductive silicon base 34 in the glass substrate 4 and polishing the conductive silicon base 34, it is possible to form the first conductive silicon member 5 which forms both the electrode surface 8a of the fixed electrode 8 and the lead electrode 9, and thus the fixed electrode 8 and the lead wiring lines thereof can be easily manufactured. Further, since it is not necessary to provide the space for forming the lead wiring lines in the vicinity of the sealed chamber 7, the capacitive pressure sensor 1 can be made small. Furthermore, since it is not necessary to provide a separate structure for reducing the parasitic capacitance, the manufacturing method can be simplified.

Further, since the electrode surface 8a of the fixed electrode 8 and the one surface 4a of the glass substrate 4 are located on the same plane, the distance $d_3$ between the fixed electrode 8 and the pressure sensitive diaphragm 2 can be adjusted only by determining the depth of the second recessed portion 3d without considering the height where the fixed electrode 8 protrudes from the glass substrate 4. Furthermore, since the sealed chamber 7 is partitioned by only the fixed electrode 8, the glass substrate 4, and the silicon substrate 3 and they are firmly bonded to one another by the anodic bonding process, the sealed chamber 7 can be sealed even more reliably. As a result, the reliability on the capacitive pressure sensor 1 can be improved.

Furthermore, since the coefficient of thermal expansion of the glass substrate 4 is set to be almost equal to those of the silicon substrate 3 and the first and second conductive silicon members 5 and 6, there is no possibility that the peeling or split among the glass substrate 4, the silicon substrate 3, and the first and second conductive silicon members 5 and 6 will occur when the heat press process is performed. As a result, the defective ratio can be reduced.

Another Example of Capacitive Pressure Sensor and Method of Manufacturing the Same Next, a method of manufacturing another capacitive pressure sensor, which is another example of the present embodiment, will be described. The manufacturing method is almost the same as that of the capacitive pressure sensor 1 previously described, except that the first and second protruding portions 36 and 37 are buried in the glass substrate 4 and polished and then one surface 46a of the first protruding portion 36 is etched so that the one surface 46a is recessed from the one surface 4a of the glass substrate 4, as shown in FIG. 5A. Specifically, a metal mask M is formed in a partial region of the one surface 4a of the glass substrate 4 obtained in FIG. 4C, the partial region not including the one surface 46a of the first protruding portion 36, and then the metal mask M is wet-etched so that the one surface 46a of the first protruding portion 36 is recessed, thereby forming a third recessed portion 47. It is preferable that the depth of the third recessed portion 47 be 0.7 to 0.8 μm. The metal mask M is removed after the wet etching process.

Thereafter, as shown in FIG. 5B, a silicon substrate 23 having a thickness of about 300 to 500 μm is stacked on the one surface 4a of the glass substrate 4 and then both the substrates 23 and 4 are bonded to each other by an anodic bonding process. The connection electrode 11 is provided beforehand on the other surface 34b of the silicon substrate 23. When the silicon substrate 23 is bonded to the glass substrate 4, the positional adjustment on the silicon substrate 23 and the glass substrate 4 is performed such that the connection electrode 11 is bonded to the one surface 37a of the second protruding portion 37, and then the anodic bonding process is performed. Then, the silicon substrate 23 is stacked on the third recessed portion 47 so as to seal the third recessed portion 47, thereby forming a sealed chamber 27.

Subsequently, as shown in FIG. 5C, the one surface 23a of the silicon substrate 23 is polished or etched until the thickness of the silicon substrate 23 reaches 50 to 60 μm. By the etching process, the silicon substrate 23 located on the sealed chamber 27 becomes a pressure sensitive diaphragm 22. As such, a capacitive pressure sensor 21, which is another example of the present embodiment, is manufactured.

Further, in the manufacturing method, by preparing a thin silicon substrate beforehand and bonding the silicon substrate to a glass substrate by the anodic bonding process, the polishing or etching process on the silicon substrate after the anodic bonding process may be omitted.

The capacitive pressure sensor 21 has almost the same configuration as the capacitive pressure sensor 1 shown in FIGS. 1 and 2, except that one surface 15a of a first conductive silicon member 15 forming the fixed electrode 8 is recessed toward the other surface 4b forming the opposite electrode 9, the recessed portion becomes the sealed chamber 27, and the silicon substrate 23 having the pressure sensitive diaphragm 22 is composed of a flat plate whose thickness is about 50 to 60 μm.

According to the capacitive pressure sensor 21, since the electrode surface 8a of the fixed electrode 8 is recessed toward the lead electrode 9 from the one surface 4a of the glass substrate 4, an empty portion formed by recessing the first conductive silicon member 15 can be used as the sealed chamber 27. Thereby, it is possible to make the capacitive pressure sensor 21 even thinner. Further, since it is possible to make the thickness of the silicon substrate 23 having the pressure sensitive diaphragm 22 even thinner, the capacitive pressure sensor 21 can also be made even thinner.

Another Example of a Capacitive Pressure Sensor

In a capacitive pressure sensor 31 shown in FIG. 6, the silicon substrate 23 is bonded to the glass substrate 4 by the anodic bonding process in FIG. 5B, and a fourth recessed portion 48 is formed in a region, which is located on the one surface 23a of the silicon substrate 23 and is located above the sealed chamber 27, by an etching process. Here, a part of the silicon substrate 23 made to be thin due to the fourth recessed portion 48 becomes a pressure sensitive diaphragm 32.

According to the configuration, since the polishing amount or the etching amount of the silicon substrate 23 can be more reduced than that in the case of the capacitive pressure sensor 21 shown in FIG. 5, the manufacturing process can be further simplified. Further, according to the configuration, since the silicon substrate 23 is polished or etched only on the one surface 23*a* thereof so as to form the pressure sensitive diaphragm 32 differently from the capacitive pressure sensor 1 shown in FIGS. 1 and 2 in which the recessed portions are formed on both surfaces thereof, it is possible to control the thickness of the pressure sensitive diaphragm 32 even more precisely.

Furthermore, according to the capacitive pressure sensor 31 having the configuration described above, since a peripheral portion 23*e* surrounding the pressure sensitive diaphragm 32 is formed to be thick, it is possible to increase the strength of the capacitive pressure sensor 31.

The invention claimed is:

1. A capacitive pressure sensor comprising:
   a conductive silicon substrate having a diaphragm;
   an insulating substrate having a fixed electrode, the insulating substrate overlapping the conductive silicon substrate so as to be bonded thereto; and
   a sealed chamber formed between the diaphragm and the fixed electrode,
   wherein a conductive silicon member is buried in a part of the insulating substrate,
   a portion of the conductive silicon member is exposed toward a surface of the insulating substrate facing the sealed chamber so as to form the fixed electrode, and
   another portion of the conductive silicon member is exposed toward the other surface of the insulating substrate not facing the sealed chamber so as to form a lead electrode of the fixed electrode.

2. The capacitive pressure sensor according to claim 1, wherein the conductive silicon member is buried to pass through between the surface of the insulating substrate facing the sealed chamber and the other surface of the insulating substrate not facing the sealed chamber.

3. The capacitive pressure sensor according to claim 1, wherein an electrode surface of the fixed electrode formed by the conductive silicon member and the surface of the insulating substrate facing the sealed chamber are located on the same plane.

4. The capacitive pressure sensor according to claim 1, wherein the electrode surface of the fixed electrode formed by the conductive silicon member is recessed toward the lead electrode from the surface of the insulating substrate facing the sealed chamber.

5. The capacitive pressure sensor according to claim 1, wherein the sealed chamber is formed to be partitioned by only the fixed electrode, the insulating substrate, and the conductive silicon substrate.

6. The capacitive pressure sensor according to claim 1, wherein the insulating substrate is a glass substrate.

* * * * *